(12) United States Patent
Clemen

(10) Patent No.: US 8,701,385 B2
(45) Date of Patent: Apr. 22, 2014

(54) METHOD AND APPARATUS FOR THE OPERATION OF A TURBOPROP AIRCRAFT ENGINE PROVIDED WITH PUSHER PROPELLERS

(75) Inventor: Carsten Clemen, Mittenwalde (DE)

(73) Assignee: Rolls-Royce Deutschland Ltd & Co KG (DE)

( * ) Notice: Subject to any disclaimer, the term of this patent is extended or adjusted under 35 U.S.C. 154(b) by 711 days.

(21) Appl. No.: 12/632,505

(22) Filed: Dec. 7, 2009

(65) Prior Publication Data
US 2010/0139278 A1   Jun. 10, 2010

(30) Foreign Application Priority Data

Dec. 5, 2008 (DE) .................. 10 2008 060 488

(51) Int. Cl.
*B64G 1/40* (2006.01)
*F02K 1/38* (2006.01)
*B64D 29/00* (2006.01)

(52) U.S. Cl.
USPC .............. 60/204; 60/262; 60/269; 244/53 R

(58) Field of Classification Search
USPC ................ 60/204, 226.1, 262, 268, 269, 767
See application file for complete search history.

(56) References Cited

U.S. PATENT DOCUMENTS

| | | | | |
|---|---|---|---|---|
| 2,586,054 | A * | 2/1952 | Jonas ..................... | 416/90 R |
| 3,968,647 | A | 7/1976 | Boudigues | |
| 4,055,949 | A | 11/1977 | Boudigues | |
| 4,183,210 | A | 1/1980 | Snell | |
| 4,488,399 | A | 12/1984 | Robey et al. | |
| 4,597,675 | A * | 7/1986 | Maertins et al. .............. | 374/115 |
| 4,892,269 | A * | 1/1990 | Greco et al. ................ | 244/53 R |
| 4,930,725 | A * | 6/1990 | Thompson et al. ......... | 244/53 R |
| 5,112,191 | A | 5/1992 | Strock et al. | |
| 5,161,369 | A | 11/1992 | Williams | |
| 5,313,789 | A * | 5/1994 | Loving ........................... | 60/246 |
| 5,558,500 | A * | 9/1996 | Elliott et al. .............. | 416/220 R |
| 5,746,047 | A * | 5/1998 | Steyer et al. .................. | 60/39.5 |
| 5,947,412 | A * | 9/1999 | Berman ........................ | 244/1 N |
| 2007/0209368 | A1 | 9/2007 | Giffin et al. | |

FOREIGN PATENT DOCUMENTS

| | | |
|---|---|---|
| DE | 1256483 | 12/1967 |
| DE | 2422105 | 11/1974 |
| DE | 2801374 | 7/1978 |
| DE | 3304417 | 9/1983 |
| DE | 3600852 | 7/1986 |
| EP | 0497472 | 8/1992 |
| EP | 1835147 | 9/2007 |
| FR | 1325278 | 4/1963 |
| GB | 1270538 | 4/1972 |
| GB | 2169968 | 7/1986 |
| GB | 2230821 | 10/1990 |

* cited by examiner

*Primary Examiner* — Ehud Gartenberg
*Assistant Examiner* — Arun Goyal
(74) *Attorney, Agent, or Firm* — Timothy J. Klima; Shuttleworth & Ingersoll, PLC

(57) ABSTRACT

A method and an apparatus is disclosed for the operation of a turboprop aircraft engine provided with pusher propellers. In order to reduce thermal loading of the pusher propellers impaired by the hot exhaust-gas flow of the engine and increase the service life of the pusher propellers, cold air from the environment outside of the aircraft engine is fed into, and mixed with, the hot exhaust-gas flow passing the pusher propellers and their connecting structure before the hot exhaust-gas flow reaches the pusher propellers.

14 Claims, 4 Drawing Sheets

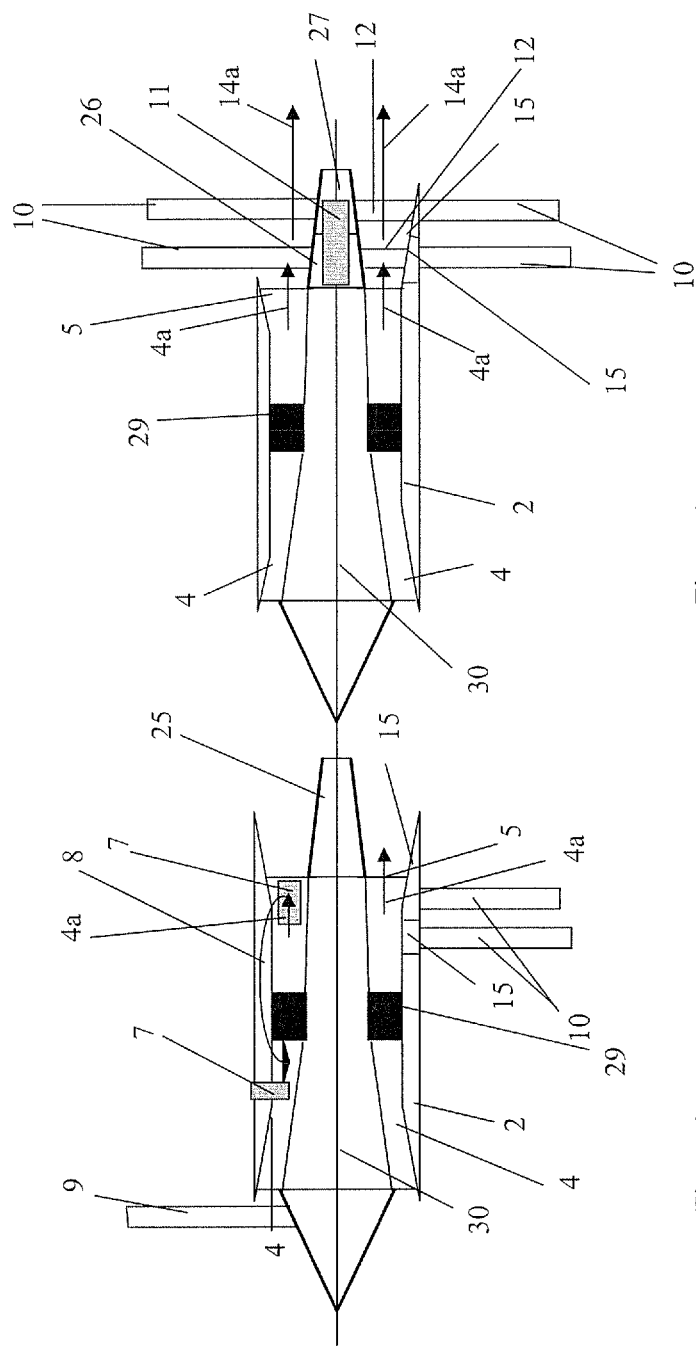

Figure 1:
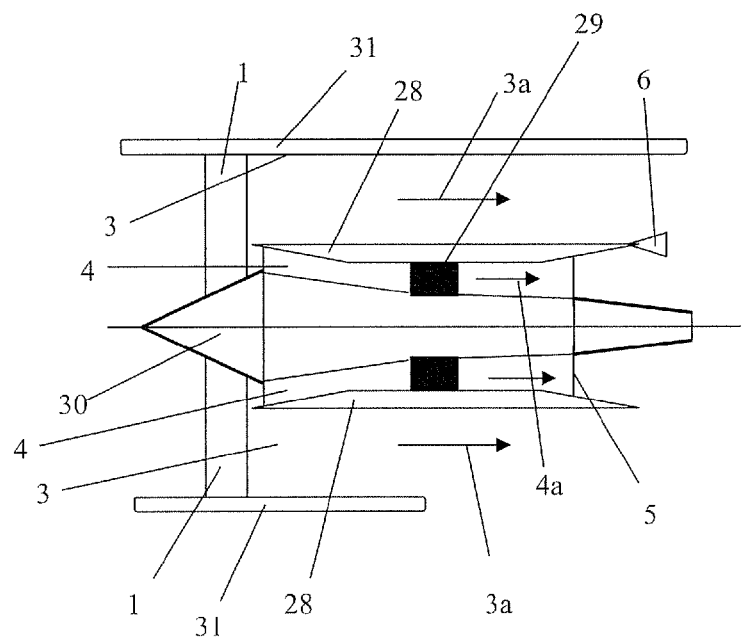

METHOD AND APPARATUS FOR THE OPERATION OF A TURBOPROP AIRCRAFT ENGINE PROVIDED WITH PUSHER PROPELLERS

This application claims priority to German Patent Application DE102008060488.7 filed Dec. 5, 2008, the entirety of which is incorporated by reference herein.

This invention relates to a method and an apparatus for the operation of a turboprop aircraft engine provided with pusher propellers.

Turboprop aircraft engines with pusher propeller installation are known on which the pusher propellers are directly connected to the power turbine. On this type of turboprop aircraft engines, the power turbine is required to rotate with very slow speed to attain high efficiency and low sound emission of the pusher propellers. However, this will result in very low efficiency of the turbine, a very large turbine and consequently high weight of the engine as well as increased fuel consumption. For a small turbine with good efficiency, the pusher propellers are required to rotate more quickly, but this will result in very high sound emission and very low efficiency of the pusher propellers and consequently high fuel consumption.

For optimum efficiency of both components, i.e. the turbine and the pusher propellers, the pusher propellers are therefore connected to the turbine via a gear drive. However, the use of a gear drive behind the turbine also entails considerable disadvantages. These lie in the fact that the pusher propellers are passed by the hot exhaust-gas flow of the engine. The resultant thermal loading of the pusher propellers incurs the risk of material fatigue and material failure. Furthermore, the hot exhaust-gas flow produces undesired noise.

It is known to connect the pusher propellers on a power turbine in such a manner to the gear drive that they are situated outside of the core flow of the power turbine. Situated within the exhaust-gas duct is, however, the connecting structure of pusher propellers and gear drive. Here, the hot exhaust-gas flow passes through a counter-rotating duct in which the propeller hubs rotate. The rotating parts are here again exposed to the very high temperature of the exhaust-gas flow, leading to problems as regards material strength, material expansion and sealing of the rotating components. Furthermore, the gear drive is located directly beneath the duct passed by the hot exhaust-gas flow, resulting in increased cooling demand of the gear drive. This increases the oil requirement of the gear drive and reduces the efficiency of the latter, which in turn leads to an increase in fuel consumption.

It is a particular object of the present invention to avoid the disadvantages of the state of the art.

To provide solution to the above problems, the present invention describes a method for the operation of a turboprop aircraft engine with pusher propeller installation according to which cold air from the environment outside of the aircraft engine is fed into, and mixed with, the hot exhaust-gas flow passing the pusher propellers and their connecting structure before the hot exhaust-gas flow reaches the pusher propellers and the connecting structure of pusher propellers and gear drive. Being passed by the now cooled exhaust-gas flow, the pusher propellers and the connecting structure of pusher propellers and gear drive are relieved from thermal load, so that the risk of material fatigue and material failure is substantially reduced and, consequently, the service life of the pusher propellers and their connecting structure to the gear drive considerably increased. Furthermore, the significantly cooled exhaust-gas flow will not produce undesired noise. In addition, increased cooling of the gear drive will not be required. Finally, the efficiency of turbine and pusher propellers is considerably increased.

There are further advantageous steps in the method. The flow velocity of the hot exhaust-gas flow of the aircraft engine is accelerated in the exhaust-gas flow to decrease the static pressure in the flow duct to such a level that the pressure difference between duct and external flow is sufficient to induce cold air from the environment into the duct. Upon supply of cold air from the environment, the flow is again retarded. The cold air from the environment is supplied at an inflow angle oriented in the direction of the hot exhaust-gas flow, and the cold air is routed from the environment through a suitably shaped (e.g. straight, s-shaped) duct before being introduced into the hot exhaust-gas flow.

Another object of the present invention is to provide an apparatus for the performance of the method for the operation of a turboprop aircraft engine in pusher-propeller configuration with an engine nacelle, with at least one duct for the supply of cold air from the environment into the hot exhaust-gas flow passing the exhaust-gas duct being arranged in flow direction of the hot exhaust-gas flow of the engine at the rearward end of the non-rotating engine nacelle and upstream of the pusher propellers. The advantages described above for the method according to the present invention are also achieved herewith.

Further advantageous features of the apparatus include providing at least one duct as a duct arrangement surrounding the free end of the non-rotating engine nacelle and the duct arrangement is disposed at an inflow angle oriented in flow direction of the hot exhaust-gas flow in the exhaust-gas duct and designed as a suitably shaped duct (e.g. straight, s-shaped etc.).

Figure 2:
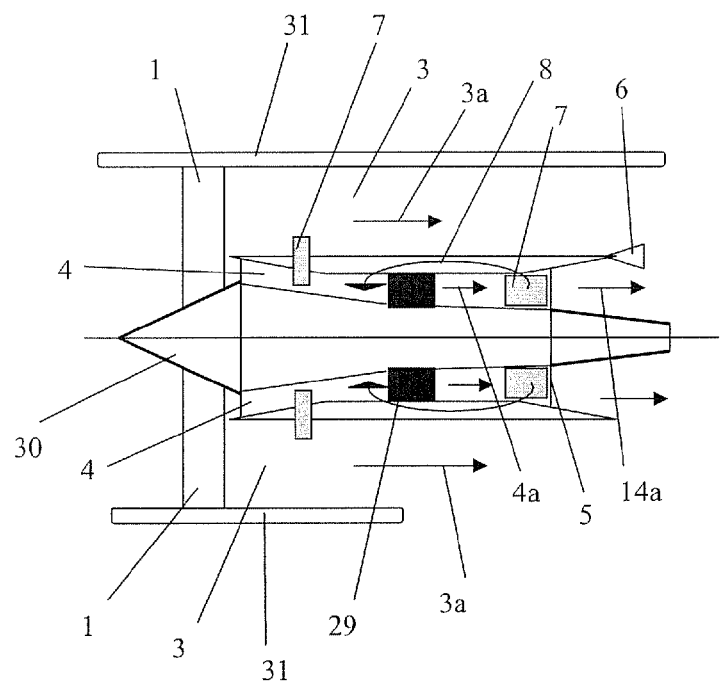
Figure 5:
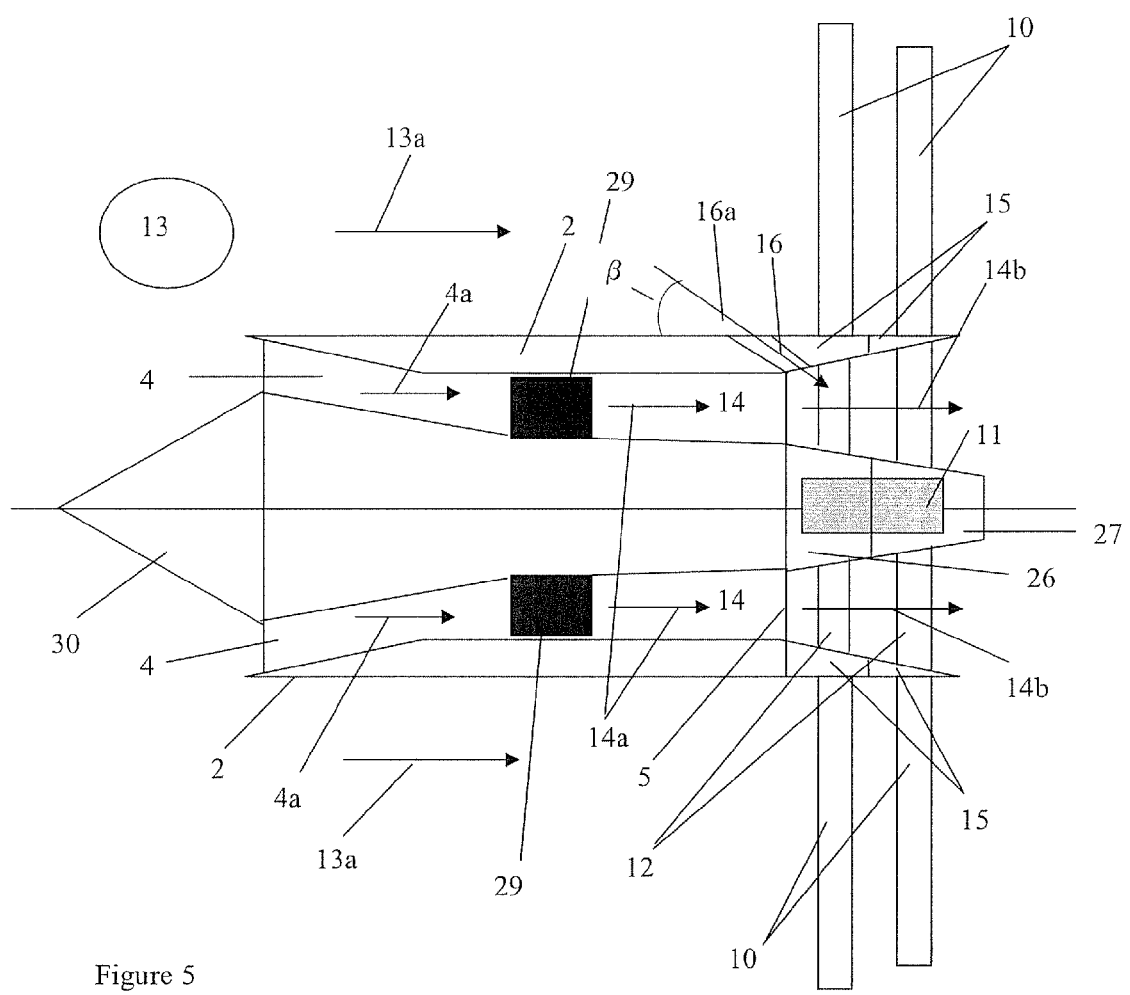
Figure 6:
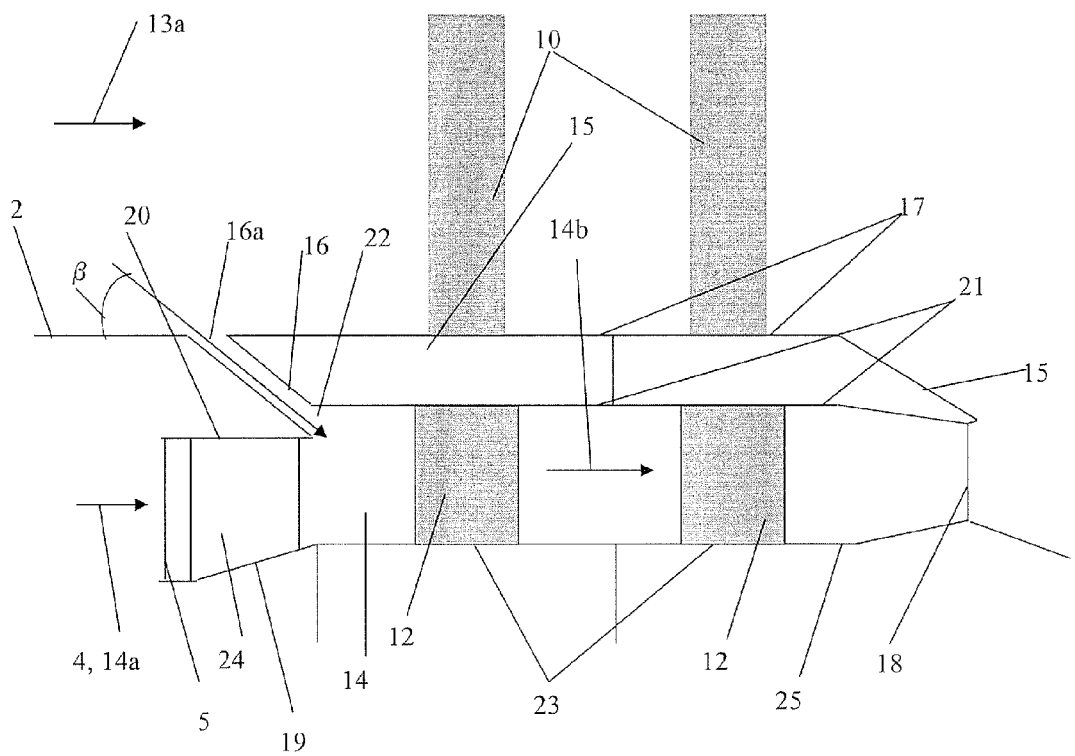
Figure 7:
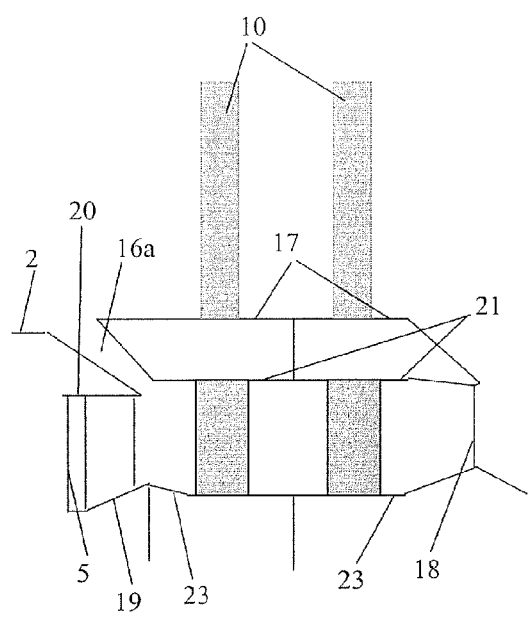
Figure 8:
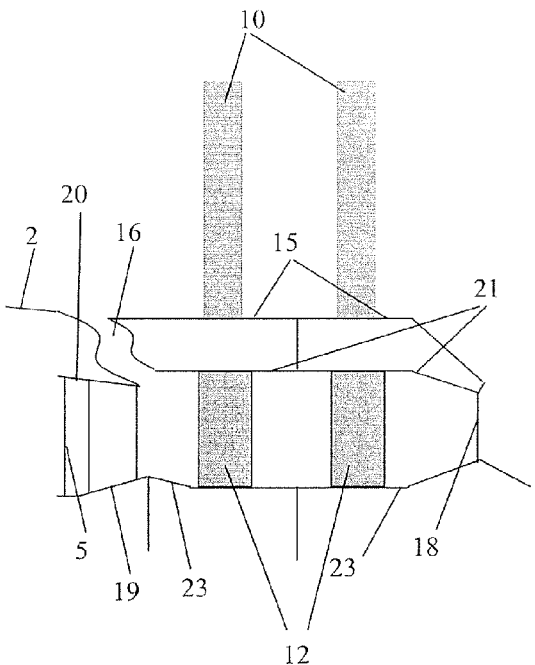

The method according to the present invention for the operation of a turboprop aircraft engine provided with pusher propellers is more fully described below with an inventive apparatus for the performance of the method, which is represented in the following figures:

FIGS. 1 and 2 show schematic longitudinal sections of turbofan engines in accordance with the state of the art, FIGS. 3 and 4 show schematic longitudinal sections of turboprop engines in accordance with the state of the art, FIG. 5 shows a schematic longitudinal section of a turboprop engine, upper half in accordance with the present invention and lower half in accordance with the state of the art as per FIG. 4, lower half, and FIGS. 6 to 8 show enlarged detail representations of the right-hand upper portion of FIG. 5.

FIG. 1 shows in the upper half a turbofan engine according to the state of the art with engine shaft 30, blower (fan) 1, stationary engine nacelle 31, bypass flow duct 3 with bypass flow 3*a*, stationary core flow fairing 28, core flow duct 4, combustion chamber 29, turbine 5 and mixer 6 for mixing the core flow 4*a* and the bypass flow 3*a* (mixed jet). FIG. 1 shows in the lower half a turbofan engine with blower (fan) 1, engine nacelle 31, bypass flow duct 3, core flow duct 4 and turbine 5 without mixer, i.e. without mixing bypass and core flow 3*a* and 4*a*, respectively.

FIG. 2 shows the same configuration of a turbofan engine as in FIG. 1, however with heat exchangers 7 in the core flow duct 4 and a recuperator 8 as heat exchanger in the core flow duct 4 by which the heat from the exhaust-gas flow 14*a* of the turbine 5 is returned to the core flow 4*a* in the core flow duct 4 upstream of the combustion chamber 29 (intercooled recuperative concept).

Unlike the turbofan engines with outer engine nacelle 31 and inner core flow fairing 28 as shown in FIGS. 1 and 2, the turboprop engines described hereinafter include only the outer engine nacelle 2 which also has the function of a core flow fairing.

FIG. 3 shows in the upper half a turboprop engine with a tractor propeller 9 on the engine shaft 30 and a core flow 4a in the core flow duct 4. In addition, this turboprop engine can also be equipped with heat exchangers 7 and/or a recuperator 8 as heat exchanger in the exhaust-gas system of the combustion chamber 29. FIG. 3 shows in the lower half a turboprop engine with core flow 4a in the core flow duct 4 and, arranged on counter-rotating propeller hubs 15, two pusher propellers 10 which are directly connected to the power turbine 5 and are therefore situated upstream of the exhaust-gas system. The exhaust-gas system is here designed analogically to that in FIG. 1, lower half. Arranged at the end of the engine shaft 30 is the rotor hub 25 which is here not employed by the pusher propellers 10.

FIG. 4 again shows the configuration of a turboprop engine with pusher propellers 10 and core flow 4a in the core flow duct 4. However, on this turboprop engine, the pusher propellers 10 are connected to the power turbine 5 via a gear drive 11 and associated to counter-rotating propeller hubs 26, 27 at the end of the engine shaft 30. On the engine shown in the upper half, the pusher propellers 10 are connected to the counter-rotating propeller hubs 26, 27, and thus to the gear drive 11, in such a manner that the exhaust jet, i.e. the hot exhaust-gas flow 14a of the core flow 4a, passes immediately through the pusher propellers 10. On the engine shown in the lower half, the pusher propellers 10 are situated outside of the core flow 4a in the core flow duct 4, as on the engine as per FIG. 3, lower half. The connecting structure 12 of pusher propellers 10 and gear drive 11 is, however, situated in the exhaust-gas duct 14, i.e. in the core flow duct 4 with the hot exhaust-gas flow 14a. The connecting structure 12 between the pusher propellers 10 or their counter-rotating propeller hubs 15, respectively, and the propeller hubs 26, 27 enclosing the gear drive 11 is provided by a connecting mechanism in extension of the pusher propellers 10, for example bolts, and an aerodynamic fairing enclosing the connecting mechanism.

The apparatus according to the present invention only relates to the application on turboprop engines whose state of the art is shown in FIGS. 3 and 4. In particular, the apparatus according to the present invention relates to configurations of turboprop aircraft engines with pusher propellers 10, as shown in FIG. 3, lower half and in FIG. 4.

The apparatus according to the present invention makes use of the advantages of the configuration of the turboprop aircraft engine according to FIG. 4, lower half, and eliminates the disadvantages thereof. The configuration as per FIG. 4, lower half, is again found in FIG. 5, lower half. Juxtaposed in FIG. 5, upper half, is the apparatus according to the present invention. This is characterized in that air as external flow 13a is fed from the environment 13 outside of the engine cell (engine nacelle 2) into the exhaust-gas duct 14. This cold air cools the exhaust jet or the exhaust-gas flow 14a, respectively. Thus, the disadvantages with regard to material strength, material expansion, sealing of the arrangement, increased cooling demand of the gear drive 11 and reduced gear drive efficiency are eliminated. The design and functioning of the apparatus of an exhaust-gas cooling system in accordance with the present invention is hereinafter described.

FIG. 5 shows in the upper half a cooling-air duct 16 between the rearward end of the stationary engine nacelle 2 and the following counter-rotating propeller hubs 15 with the pusher propellers 10. The cooling-air duct 16 is oriented at an inflow angle β in direction of flow of the hot exhaust-gas flow 14a in the core flow duct 4. Through the cooling-air duct 16, a cooling-air flow 16a of cold supply air from the external flow 13a in the environment 13 is fed to the exhaust-gas flow 14a, the core flow duct 4 or the exhaust-gas duct 14, respectively, mixed with the hot exhaust-gas flow 14a and discharged as cooled exhaust-gas flow 14b in the exhaust-gas duct 14 from the engine. In the process, only the cooled exhaust-gas flow 14b passes the area of the pusher propellers 10 or the connecting structure 12 between the pusher propellers 10 and the gear drive 11, respectively. The cooling-air duct 16 annularly encloses the entire engine nacelle 2, thereby forming a duct arrangement.

FIG. 6 shows the basic operation of the apparatus or the exhaust-gas cooling system, respectively. The hot air, i.e. the hot core flow 4a in the core flow duct 4 from the turbine 5, is formed in the nozzle-like constricting duct 24 between the stationary, non-rotating hub 19 at the rearward end of the engine shaft 30 and the stationary, non-rotating casing 20 of the engine nacelle 2 and accelerated between the non-rotating hub 19 and the non-rotating casing 20 to lower the static pressure. The constriction of the duct 24 can be provided by inclining either the upper or the lower or both duct walls 21, 23. The layout of the duct 24, and the resultant decrease of the static pressure in the duct 24, increases the pressure difference between the duct 24 and the external flow 13a to such a level that the cold supply air, i.e. the cold supply airflow 16a, is fed from the external flow 13a in the environment to the exhaust-gas duct 14 for the exhaust-gas flow 14a via the appropriately positioned and dimensioned cooling-air duct 16. The tapping point for the cooling air 16a from the ambient air is situated at any position between the engine tip, i.e. the rearward end of the non-rotating engine nacelle 2, and the first pusher propeller 10 on the rotating propeller hub 15. The supply point 22 for the cold air into the exhaust-gas duct 14 is situated downstream of the turbine 5 and upstream of the first pusher propeller 10 or the connecting structure 12 of pusher propeller 10 and gear drive 11, respectively, and separates the stationary engine nacelle 2 from the rotating propeller nacelle 17 or the propeller hubs 15, respectively. At the supply point 22, the exhaust-gas duct 14 for the exhaust-gas flow 14a widens in accordance with the air quantity supplied to reduce the flow velocity through the exhaust-gas duct 14. The widening can be provided either at the upper duct wall 21 or the lower duct wall 23 or on both duct walls 21, 23. The mixed fluid passes the exhaust-gas duct 14 and exits through a nozzle 18 to the environment. Appropriate shaping of the rotating propeller hubs 15 as well as the upper and lower duct walls 21, 23 enables the cold supply air of the cooling-air flow 16a to be effectively mixed with the hot exhaust-gas flow 14a in the exhaust-gas duct 4.

FIGS. 7 and 8 show special forms of the cooling-air duct 16. This can be constricted in the direction of the cooling-air flow 16a like a nozzle as per FIG. 7 or be an s-shaped duct arrangement as per FIG. 8.

Exhaust gas cooling according to the present invention enables the exhaust-gas jet or the exhaust-gas flow 14a, respectively, to be substantially cooled in dependence of the cooling-air flow (for example, 60% cooling-air mass flow in relation to the turbine outlet mass flow results in a cooling by 25% or 200 K, respectively). This means that the flow around the components in the exhaust-gas duct 14 downstream of the power turbine 5, these being especially the propellers 10 and/or connecting structure 12, two rotating propeller hubs 15 and the outer wall of the gear drive 11, will be considerably colder than without the cooling air. With the material stress (material strength and material expansion) being thereby reduced, less expensive and lighter material can be used for the propellers 10 and/or connecting structure 12, enclosure of the propeller hubs 15 and the gear drive 11. The gear drive 11 will be able to work with less cooling, i.e. gear oil, gear wear will be reduced and gear efficiency increased. The exhaust-gas temperature will decrease, which means that the mixing losses due to mixing of the exhaust-gas flow 14a with the ambient air 13 are reduced. In combination, these effects lead to reduced material costs, lower engine weight, lower wear and lower fuel consumption and thus smaller manufacturing, maintenance and operating expenditure.

Finally, with an uncooled system according to the state of the art being hardly implementable due to the disadvantages described, application of the cooled system according to the present invention is compulsory if the principle of pusher propeller with gear drive and rotor hubs situated in the exhaust-gas jet is to be chosen.

LIST OF REFERENCE NUMERALS

01 Blower (fan)
02 Engine nacelle
03 Bypass flow duct
03a Bypass flow
04 Core flow duct
04a Core flow
05 Turbine
06 Mixer
07 Heat exchanger
08 Recuperator (heat exchanger)
09 Tractor propeller
10 Pusher propeller
11 Gear drive
12 Connecting structure
13 Environment
13a External flow
14 Exhaust-gas duct
14a Exhaust-gas flow, hot
14b Exhaust-gas flow, cooled
15 Propeller hub
16 Cooling-air duct
16a Cooling-air flow, cold air
17 Propeller nacelle
18 Nozzle
19 Hub, non-rotating
20 Casing, non-rotating
21 Duct wall (upper)
22 Supply point
23 Duct wall (lower)
24 Duct
25 Rotor hub
26 Propeller hub
27 Propeller hub
28 Core flow fairing
29 Combustion chamber
30 Engine shaft
31 Engine nacelle
β Inflow angle

What is claimed is:

1. A method for operating a turboprop aircraft engine having a pusher propeller, comprising:
   providing an aircraft engine having a pusher propeller, a connecting structure positioned radially inwardly of the pusher propeller and connecting the pusher propeller to a drive and a nacelle surrounding a core flow duct of the engine, the nacelle having an outer boundary, an inner boundary and at least one cooling air duct extending from the outer boundary to the inner boundary, the pusher propeller having a diameter greater than a circumference of the nacelle and at least a portion of the connecting structure having a diameter smaller than the circumference of the nacelle;
   circumferentially enclosing an exhaust gas flow from the aircraft engine with an exhaust gas duct extending from an engine turbine to downstream of at least a portion of the connecting structure, wherein the inner boundary of the nacelle forms an outer boundary of the exhaust gas duct, the connecting structure being positioned axially at a position of the pusher propeller and extending radially outwardly of at least a portion of the exhaust gas duct at an axial position where the exhaust gas duct is axially aligned with the connecting structure;
   feeding cold air from an environment external to the aircraft engine through the at least one cooling air duct in the nacelle and mixing the cold air into the exhaust gas flow in the exhaust gas duct aft of the engine turbine and upstream of the connecting structure to cool the exhaust gas flow prior to reaching the connecting structure;
   retarding a flow velocity of the exhaust gas flow upon feeding of the cold air into the exhaust gas flow by continuously widening the exhaust gas duct from the at least one cooling air duct to the connecting structure, the exhaust gas duct being radially outwardly enclosed continuously from the at least one cooling air duct to downstream of at least a portion of the connecting structure;
   the cold air being at substantially a temperature of the external environment at a position that it is fed into the exhaust gas flow.

2. The method of claim 1, and further comprising accelerating the flow velocity of the exhaust gas flow of the aircraft engine to decrease a static pressure in the exhaust gas flow prior to feeding and mixing the cold air into the exhaust gas flow.

3. The method of claim 2, and further comprising feeding the cold air from the environment at an inflow angle oriented in a direction of the exhaust gas flow.

4. The method of claim 3, and further comprising routing the cold air from the environment through an s-shaped duct before feeding the cold air into the exhaust gas flow.

5. The method of claim 1, and further comprising feeding the cold air from the environment at an inflow angle oriented in a direction of the exhaust gas flow.

6. The method of claim 5, and further comprising routing the cold air from the environment through an s-shaped duct before feeding the cold air into the exhaust gas flow.

7. The method of claim 1, and further comprising routing the cold air from the environment through an s-shaped duct before feeding the cold air into the exhaust gas flow.

8. The method of claim 1, and further comprising feeding the cold air from the environment into the exhaust gas flow through a gap between a downstream edge of the stationary nacelle and an upstream edge of a rotating propeller hub radially positioned between the pusher propeller and connecting structure, the downstream edge of the stationary nacelle and the upstream edge of the rotating propeller hub immediately adjacent and radially aligned with one another.

9. An apparatus for cooling a hot exhaust gas of a turboprop aircraft engine, comprising:
   an exhaust gas duct for passing a hot exhaust gas flow exiting a turbine of the engine;
   a pusher propeller positioned aft of the turbine,
   a connecting structure of the pusher propeller positioned in the exhaust gas flow downstream of the turbine of the engine, the connecting structure positioned radially inwardly of the pusher propeller;

a non-rotating engine nacelle surrounding a core flow duct of the engine, the nacelle having an outer boundary, an inner boundary and at least one cooling air duct extending from the outer boundary to the inner boundary, the pusher propeller having a diameter greater than a circumference of the nacelle and at least a portion of the connecting structure having a diameter smaller than the circumference of the nacelle;

at least one cooling air duct positioned in the nacelle and extending from the outer boundary to the inner boundary for supplying cold air from an external environment into the hot exhaust gas flow, the cooling air duct being oriented in a flow direction of the hot exhaust gas flow and positioned at a rearward end of the engine nacelle and upstream of the connecting structure of the pusher propeller thereby cooling the connecting structure;

the exhaust gas duct extending from the turbine to downstream of at least a portion of the connecting structure, wherein the inner boundary of the nacelle forms an outer boundary of the exhaust gas duct, the connecting structure being positioned axially at a position of the pusher propeller and extending radially outwardly of at least a portion of the exhaust gas duct at an axial position where the exhaust gas duct is axially aligned with the connecting structure;

wherein the exhaust gas duct widens at an axial position continuously from:

aligned with the cooling air duct, to the connecting structure downstream of the cooling air duct, to reduce a flow velocity of the exhaust gas flow upon supply of the cold air into the exhaust gas flow, the exhaust gas duct being radially outwardly enclosed continuously from the at least one cooling air duct to downstream of at least a portion of the connecting structure;

the cold air being at substantially a temperature of the external environment at a position that it is fed into the exhaust gas flow.

10. The apparatus of claim 9, wherein the at least one cooling air duct is provided as a duct arrangement annularly surrounding a free end of the non-rotating engine nacelle.

11. The apparatus of claim 10, wherein the cooling-air duct and the duct arrangement are disposed at an inflow angle oriented in a flow direction of the hot exhaust gas flow.

12. The apparatus of claim 11, wherein the cooling air duct and the duct arrangement have an s-shaped configuration.

13. The apparatus of claim 10, wherein the cooling air duct and the duct arrangement have an s-shaped configuration.

14. The apparatus of claim 9, wherein the cooling air duct is formed as a gap between a downstream edge of the stationary nacelle and an upstream edge of a rotating propeller hub radially positioned between the pusher propeller and connecting structure, the downstream edge of the stationary nacelle and the upstream edge of the rotating propeller hub immediately adjacent and radially aligned with one another.

\* \* \* \* \*